United States Patent [19]
Tsai

[11] Patent Number: 5,249,908
[45] Date of Patent: Oct. 5, 1993

[54] MOVABLE PALLET ASSEMBLY WITH A SWIVEL FRONT WHEEL MECHANISM

[76] Inventor: Chin-Chin Tsai, No. 89-1, Lane 679, Wu Kuang Road, Kuang Ming Ts'un, Wu Jih Hsiang, Taichung Hsien, Taiwan

[21] Appl. No.: 799,217

[22] Filed: Nov. 27, 1991

[51] Int. Cl.$^5$ ............................................... B62B 1/00
[52] U.S. Cl. ................................. 414/446; 280/46; 280/47.21; 414/490; 414/498
[58] Field of Search ............. 414/444, 446, 490, 498; 280/46, 43.1, 43.12, 47.21; 254/2 R, 3 R, 3 C, 15

[56] References Cited

U.S. PATENT DOCUMENTS

| | | | |
|---|---|---|---|
| 2,215,529 | 9/1940 | Nazarko | 414/490 |
| 2,472,989 | 6/1949 | Skipper et al. | 280/46 |
| 3,662,989 | 5/1972 | Swinson | 280/46 X |
| 4,033,597 | 7/1977 | Boyer | 280/46 |
| 4,712,966 | 12/1987 | Gross | 414/498 X |
| 4,884,936 | 12/1989 | Kawada | 414/498 |

*Primary Examiner*—Michael S. Huppert
*Assistant Examiner*—James T. Eller, Jr.
*Attorney, Agent, or Firm*—Browdy and Neimark

[57] ABSTRACT

The present disclosure is related to a movable pallet assembly with a swivel front wheel mechanism, and particularly to the type of pallet two of which can be bound together by C-shaped fixture clamps and be separated from the ground by supporting legs when used as a base in a warehouse, and be moved around as a transportation cart when the legs are lifted up. The swivel front wheel mechanism can be removably attached to the pallet, and an angle-adjustable pull stick is pivotably fixed to the swivel front wheel mount with an adjustable connecting rod pivotably secured to a slidable push block. By operation of the pull stick, the push block will be moved forward to lift the pallet assembly up or backward to lower the pallet assembly down with the supporting legs in contact with the ground.

4 Claims, 3 Drawing Sheets

1--1'

2--2'

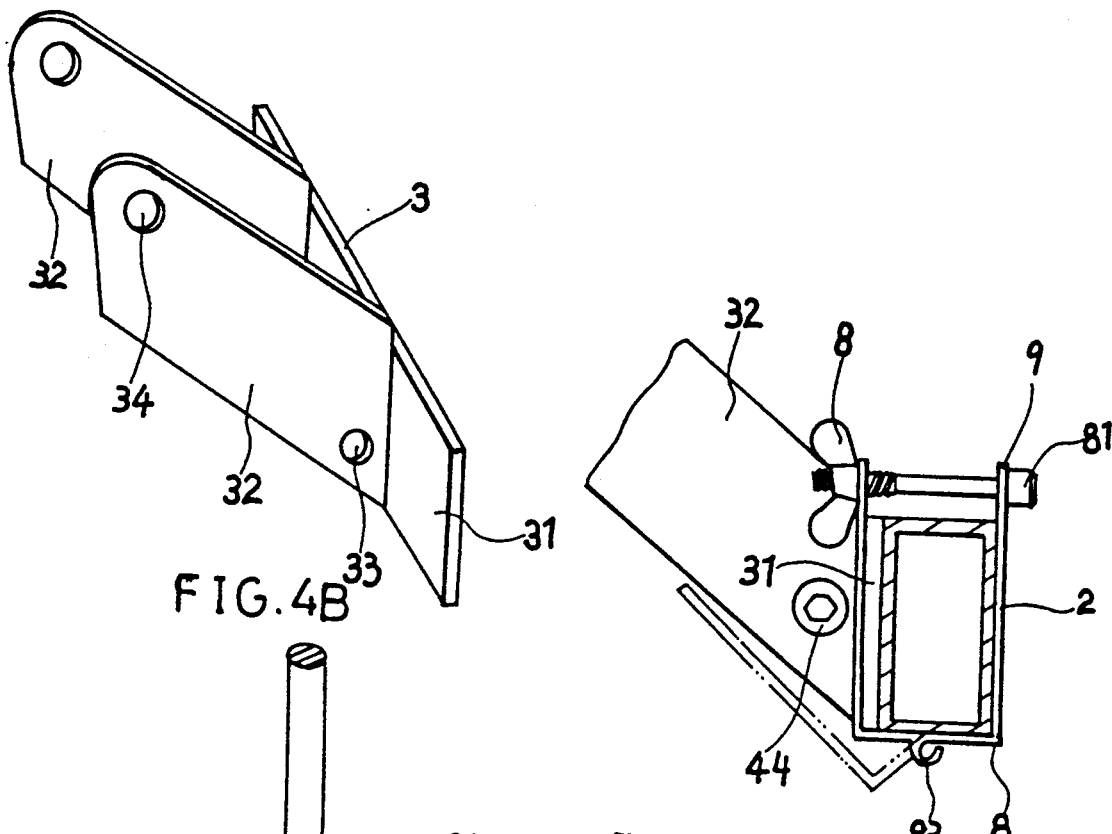
FIG. 4B
FIG. 4A
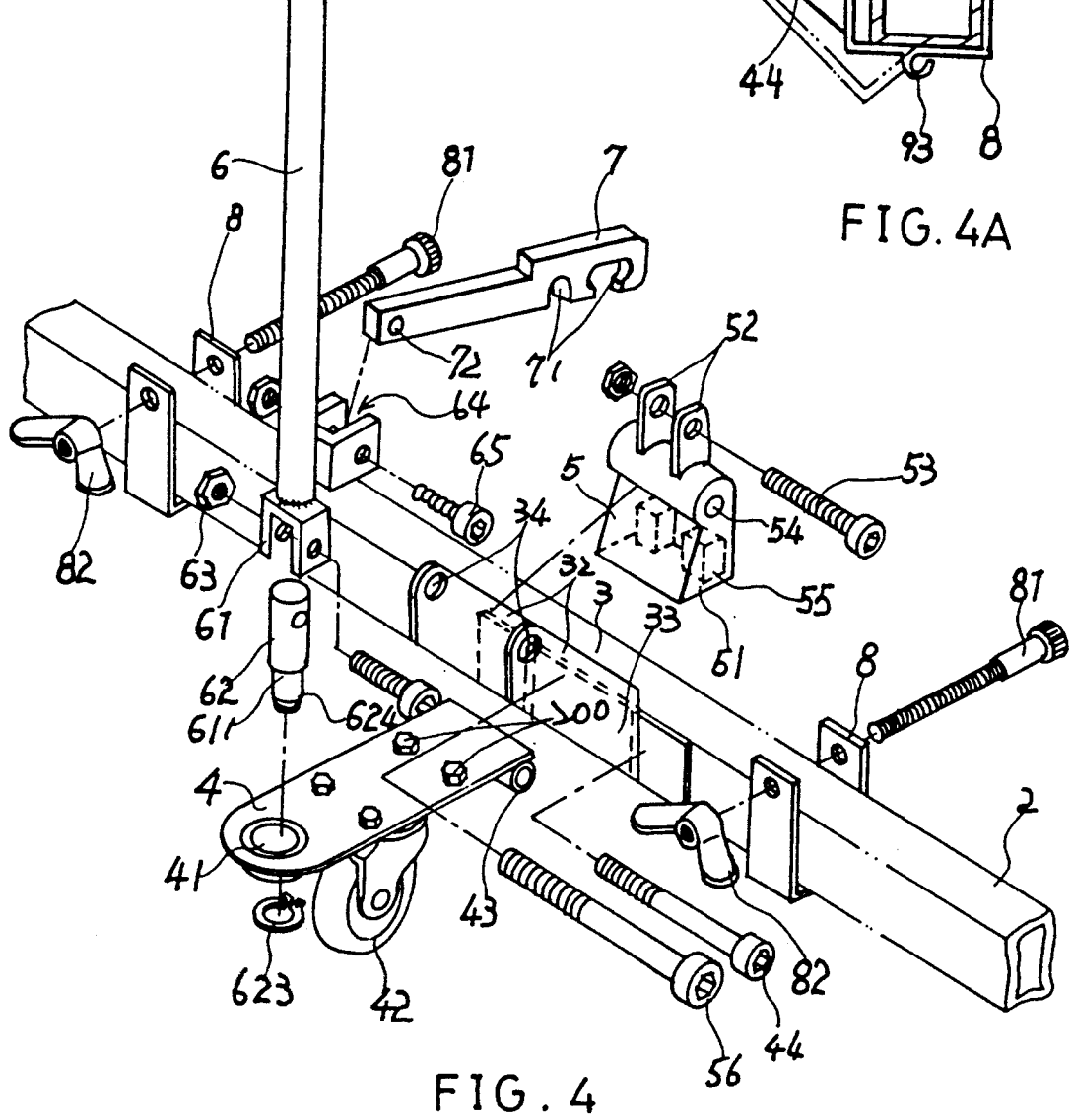
FIG. 4

MOVABLE PALLET ASSEMBLY WITH A SWIVEL FRONT WHEEL MECHANISM

FIELD OF THE INVENTION

The present invention relates to a movable pallet assembly having a swivel front wheel mechanism, which is comprised of a couple of identical pallets joined together by C-shaped fixture clamps; a first pallet is equipped with a pair of rollers, and a second pallet is provided with a pair of supporting legs which are in contact with ground when the movable pallet assembly is lowered down and used as a base in warehouse; and the pallet assembly can be moved around when the supporting legs lifted up. The control of the lift and lower of the pallet assembly is effected by way of a pull stick which is attached to the front side of the second pallet.

The pull stick is pivotably secured on the swivel wheel mount and is coupled to a slidable push block by way of a connecting rod which is adjustably associated with the top of push block so to make the operation angle of the pull stick variable.

When used as a base in a warehouse, the pallet assembly is placed with the supporting legs thereof in contact with the ground; and used as a transportation cart, the pull stick is leaned forward to lift up the pallet assembly with supporting legs separating from the ground, thereby the pallet assembly can be moved around with the help of the rollers and swivel wheel disposed on the first and second pallets respectively when the same is pulled or pushed around.

A conventional pallet is only used as a base in warehouses and generally is not able to move around without the aid of a fork lift. It is relatively expensive for small factories to equip themselves with transportion carts or forklifts in their warehouses. Therefore, the moving of goods has to be done by labor instead of mechanical equipment. The present inventor has noticed the disadvantage in small-business factories, and worked out a movable pallet assembly with a swivel front wheel mechanism to facilitate the moving of storage in working places by conventional pallets.

SUMMARY OF THE INVENTION

The primary object of the present invention is to provide a movable and multi-functional pallet assembly which is made up of a swivel front wheel mechanism and a pair of separable pallets joined together by C-shaped clamps; the swivel front wheel mechanism is adjustable to make the pallet assembly lift up or lower down accordingly for different uses.

Another object of the present invention is to provide a separable pallet assembly which is equipped with supporting legs used to support the pallet assembly when the same is lowered down to be in contact with the ground.

One further object of the present invention is to provide a pallet assembly which is equipped with an angle adjustable pull stick which is associated with a connecting rod having a pair of engagement recesses that are selectively engaged with a slidable push block so that the angle of the pull stick can be adjustably varied for different workers.

To make the present invention clearly presented in its structural characteristics, operational modes and features, a number of drawings are given in company with a detailed description of the preferred embodiment.

BRIEF DESCRIPTION OF THE DRAWINGS

FIG. 4 is a perspective view of the exploded components of the present invention;
FIG. 4A is a sectional view showing the hinge joined C-shaped clamp fixed in place by a butterfly nut and a bolt to hold a double-wing fixture means and the bar of the second pallet together;
FIG. 4B is a diagram showing the structure of the double-wing fixture means.

DETAILED DESCRIPTION OF THE PREFERRED EMBODIMENT

Figure 1:
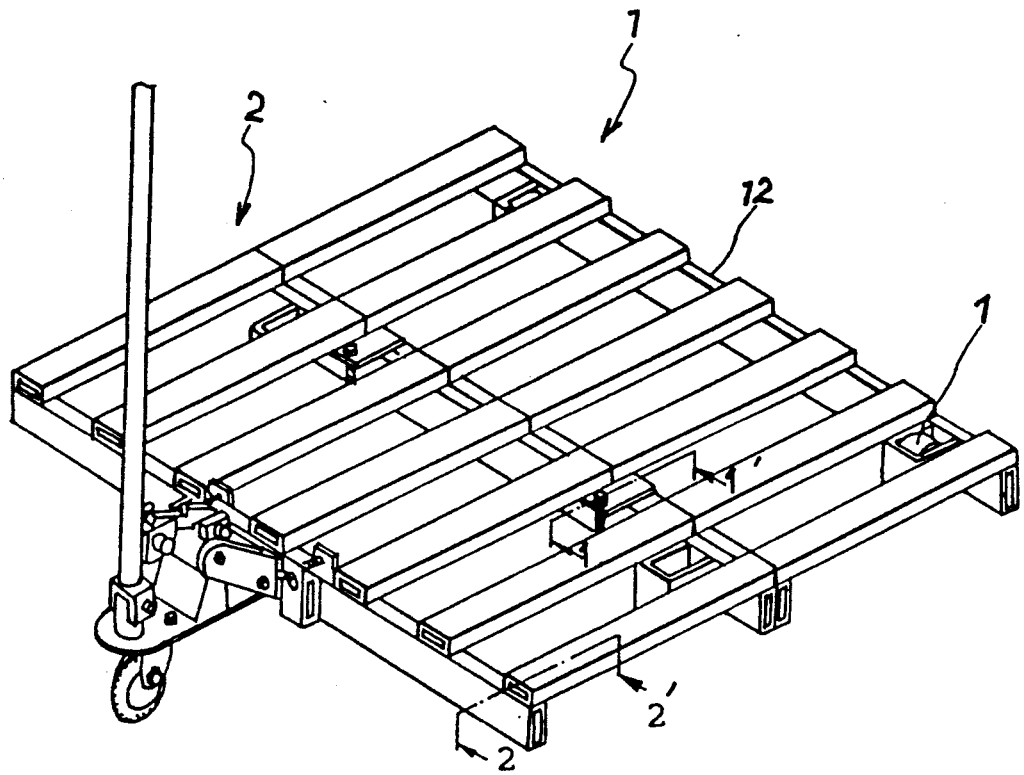
FIG. 1 is a perspective view of the present invention.
Figure 2:
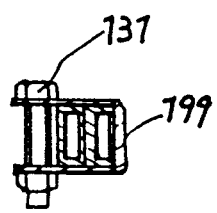
FIG. 2 is a sectional view showing the joining of two pallets by means of C-shaped clamps.
Figure 3:
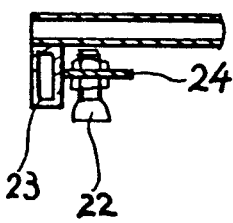
FIG. 3 is a sectional view showing the disposition of the supporting legs with respect to the pallet assembly.

Referring to FIGS. 1, 2, 3, the first pallet 1 of the pallet assembly is made up of a pair of long hollow parallel bars 12 having rectangular cross section and a plurality of identical transverse short bars which are parallelly fixed by welding. A pair of rollers 11 are mounted at the bottom of the so structured pallet 1. A second pallet 2 similar to pallet 1 is joined thereto by two pieces of C-shaped fixture clamps 199. A swivel front wheel mechanism and a pair of supporting legs 22 are mounted to the second pallet 2 when the supporting legs 22 are made to separate from the ground, the pallet assembly can be wheeled around by pulling to transport stock in a warehouse.

Figure 5:
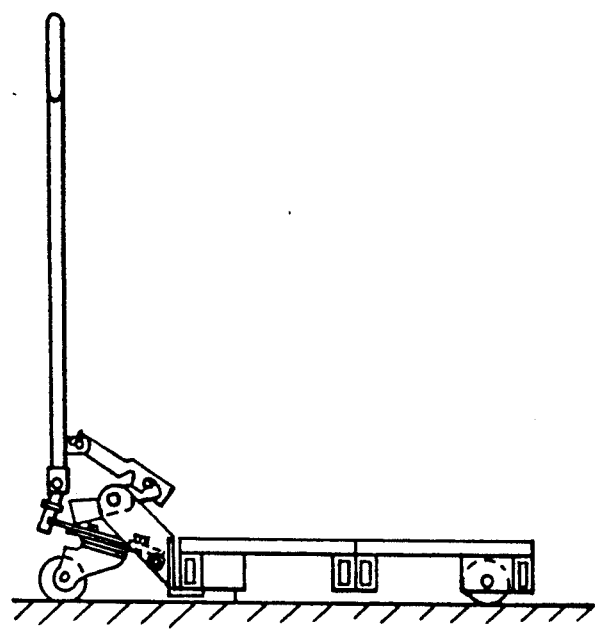
FIG. 5 is a diagram showing the present pallet assembly being lowered down with the supporting legs in contact with the ground.
Figure 6:
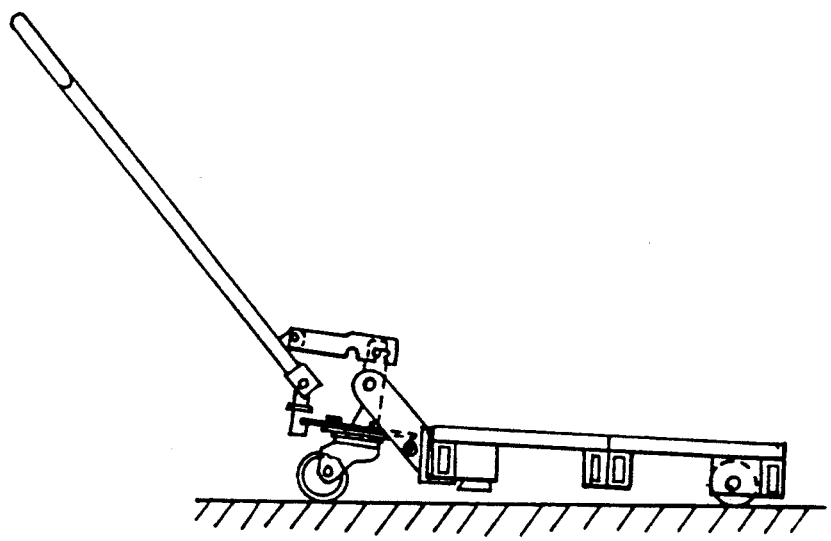
FIG. 6 is a diagram showing the present pallet assembly being lifted up and used as a movable cart.

C-shaped fixture clamps 199 are used to separably joined the first and second pallets together, as shown in FIG. 2. The C-shaped fixture clamps 199 are fixed in place by bolts 131 and nuts. The rollers 11 are secured to both ends of the long hollow parallel bar 12 disposed at the outside of the first pallet 1 and are in rolling contact with the ground so that the parallel bars 12 of both the first and second pallets are, separated from the ground as shown in FIGS. 5, 6. The supporting legs 22 are attached to the mounts 24 with the same adjustable by way of nuts; the mounts 24 are welded to one side of long hollow bar 23, as shown in FIG. 3.

The present invention includes a swivel front wheel mechanism which has an elongated pull stick 6 pivotably secured to a cylindrical connection means 62 having a groove 624 at the bottom section 611 thereof by means of a set of bolt and nut 63 so that the pull stick 6 can be pivotably swung one way or another. A wheel mount means 4 has a mounting plate to which a swivel wheel 42 is attached. A round hole 41 is disposed at the front of the mounting plate for the rotatable insertion of the cylindrical connection means 62 which is fixed in place by a clip member 623 in engagement with the groove 624. A tubular element 43 is secured at the bottom of the mounting plate for the location of a bolt 44.

A double wing fixture means 3, as shown in FIG. 4B, is comprised of a pair of parallel plates 32 and a base 31. On each of the plate 32 are disposed a hole 33 and a hole 34. A pair of C-shaped clamps 8 are used to hold the ends of the base 31 of the double wing fixture means 3 and the long hollow bar 12 of the second pallet 2, as shown in FIG. 4A. Each C-shaped clamp 8 is made up of two parts and is pivotably joined by a hinge 93. A bolt 81 and a butterfly nut 82 are combined to hold the hinged clamp 8 tightly together, thereby the double wing fixture means 3 and the second pallet 2 can be easily separated as desired.

A C-shaped fixture unit 64 is welded at the lower end of the pull stick 6. A connecting rod 7 having a through hole 72 at one end and a pair of distanced engagement recesses 71 is pivotably attached by a bolt 65 and a nut to the C-shaped fixture unit 64.

A slidable push block 5 having a pair of parallel lugs 52 which is equipped with a through hole thereon, permitting a bolt 53 to be fixed unto the lugs 52 with a nut a through bole 54 is defined on the push block 5 so that a bolt can be inserted thereinto a pair of cavities 51 are defined at the bottom of the push block 5.

To assemble the swivel wheel mechanism, the double wing fixture means 3 is first secured to the second pallet 2 by the C-shaped hinged clamps 8. The wheel mount 4 of the swivel wheel mechanism is attached to the double wing fixture means 3 by a bolt 44 which is located through the parallel plates 32 of the double wing fixture means 3 and the tubular element 43 of the mounting plate of the wheel mount 4 and is secured in place by a nut. Thereby the wheel mount 4 is joined to the pallet 2. The slidable push block 5 is joined to the double wing fixture means 3 by a bolt 56 which is disposed through the through hole 54 and the other holes on the parallel plates 32 of the double wing fixture means 3.

The connecting rod 7 having a through hole 72 at one end and a pair of recesses 71 at the other is pivotably secured to the C-shaped fixture unit 64 at one end with the through hole by the bolt 65, and is selectively in hook association with the bolt 53 disposed between the lugs 52 of the slidable push block 5, thereby the pull stick 6 can be adjustable in angle.

The slidable push block 5 is disposed on the mounting plate of the wheel mount means 4 and is associated with the double-wing fixture means 3. The cavities 55 at the bottom of the push block 5 permit the slidable push block 5 to be in engagement with the bulged nuts 200 respectively on the mounting plate when the pull stick urges the block 5 to move on the mounting plate as shown FIGS. 5, 6. Referring to FIG. 5, the stick is put in a state that the supporting legs are in contact with the ground, the pallet assembly will be used as a stock board. As shown in FIG. 6, when the pull stick is actuated in such a way that the pallet assembly will be made to lift up with the supporting legs separating from the ground so that the pallet assembly can be move around as a cart.

I claim:

1. A moveable pallet assembly having a swivel front wheel mechanism comprising:
    a first pallet and a second pallet, each said first and second pallet comprising a pair of parallel hollow long bars having a rectangular cross section, and a plurality of transversely disposed hollow short bars having a rectangular cross section, said first pallet having a pair of supporting legs which contact a ground surface when in a lowered position;
    C-shaped clamping means for separably joining said first and second pallets together;
    a front wheel mount means comprising a mounting plate and a swivel wheel, said mounting plate having a hole therein and a tubular element attached thereto;
    a cylindrical connection means rotatably secured within said hole in said mounting plate, said cylindrical connection means having a groove in a bottom portion thereof;
    an elongated pull stick pivotally attached to said cylindrical connection means, said elongated pull stick having a C-shaped fixture unit welded to a lower end thereof;
    clip means for rotatably securing said cylindrical connection means within said hole in said mounting plate;
    a double-wing fixture means attached to said front wheel mount means, including bolt and nut means joining said double-wing fixture to said tubular element of said mounting plate;
    a pair of C-shaped clamps for detachably attaching said double-wing fixture means to one of said parallel long bars of said second pallet;
    a slidable push block having a pair of parallel lugs disposed thereon and a through-hole therein, said parallel lugs having first bolt means therebetween and fixed thereto by first nut means; said through-hole having second bolt means therethrough and second nut means for coupling said slidable push block to said double-wing fixture means;
    a connecting rod pivotally attached at one end to said C-shaped fixture unit, and having a second end with hook means for engagement with said first bolt means;
    whereby when said hook means is engaged with said first bolt means and said pull stick is pivoted downwardly, said first and second pallets are raised to an elevated position wherein said pair of supporting legs are elevated above the ground surface.

2. A movable pallet assembly as claimed in claim 1, wherein said C-shaped clamps each comprise two clamping pieces pivotally hinged together, each of said clamping pieces having a through-hole therein, and a butterfly nut with bolt means passing through each said through-hole of said clamping pieces to hold said two pieces together.

3. A movable pallet assembly as claimed in claim 1, wherein said hook means comprises a pair of spaced recesses which are selectively engagable with said first bolt means.

4. A movable pallet assembly as claimed in claim 1, wherein said slidable push block has a pair of cavities at a bottom portion thereof.

* * * * *